United States Patent

[11] 3,598,395

| [72] | Inventors | Nicholas J. Carriero<br>Churchville;<br>Lawson F. Narvell, Port Deposit; Fred N. Newcomb, Kingsville, all of, Md. |
|---|---|---|
| [21] | Appl. No. | 770,186 |
| [22] | Filed | Oct. 24, 1968 |
| [45] | Patented | Aug. 10, 1971 |
| [73] | Assignee | The United States of America as represented by the Secretary of the Army |

[54] EDUCATIONAL TESTING APPARATUS
3 Claims, 5 Drawing Figs.

[52] U.S. Cl. ....................................................... 271/3, 271/9, 271/44
[51] Int. Cl. ............................................... B65h 3/24, B65h 3/44
[50] Field of Search ........................................... 271/9, 44, 54, 10, 3; 221/258

[56] References Cited
UNITED STATES PATENTS

| 1,725,400 | 8/1929 | Last | 271/44 |
|---|---|---|---|
| 1,959,854 | 5/1934 | Cameron | 271/44 |
| 2,451,213 | 10/1948 | Gollwitzer | 271/44 |
| 2,634,185 | 4/1953 | Wilder | 221/258 X |
| 2,745,664 | 5/1956 | Davies et al. | 271/44 X |
| 3,146,532 | 9/1964 | Shwisha et al. | 271/36 |
| 3,335,699 | 8/1967 | Aiken et al. | 271/44 X |

Primary Examiner—Joseph Wegbreit
Attorneys—Edward J. Kelly, Herbert Berl, Harry M. Saragovitz and Robert P. Gibson ABSTRACT: For educational and student testing purposes, questions are printed on question punchcards and the student records his answers on answer cards. The cards are then moved on to a receiving hopper and new cards are presented before the student with a new question for him to answer on a corresponding answer card.

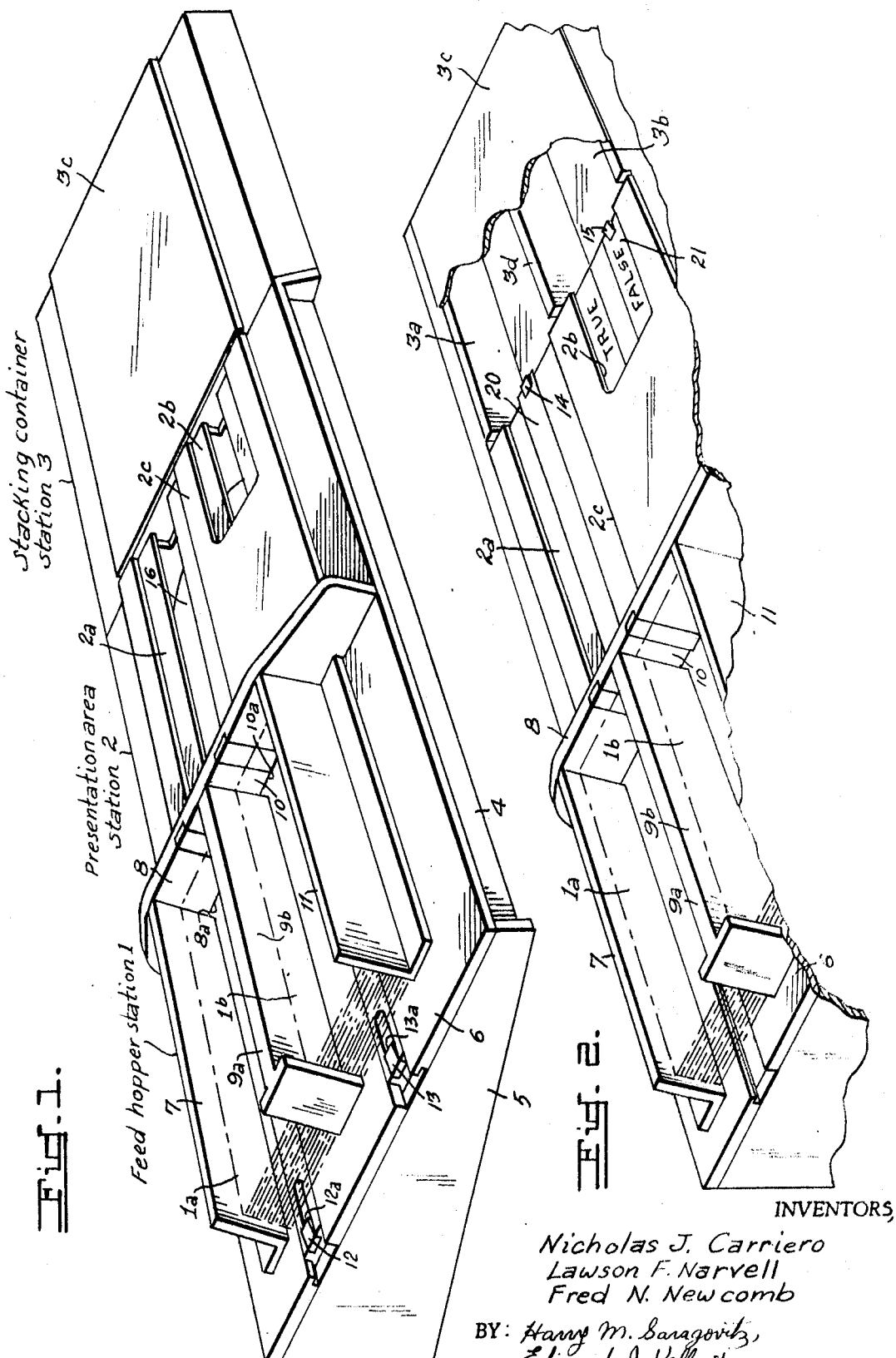

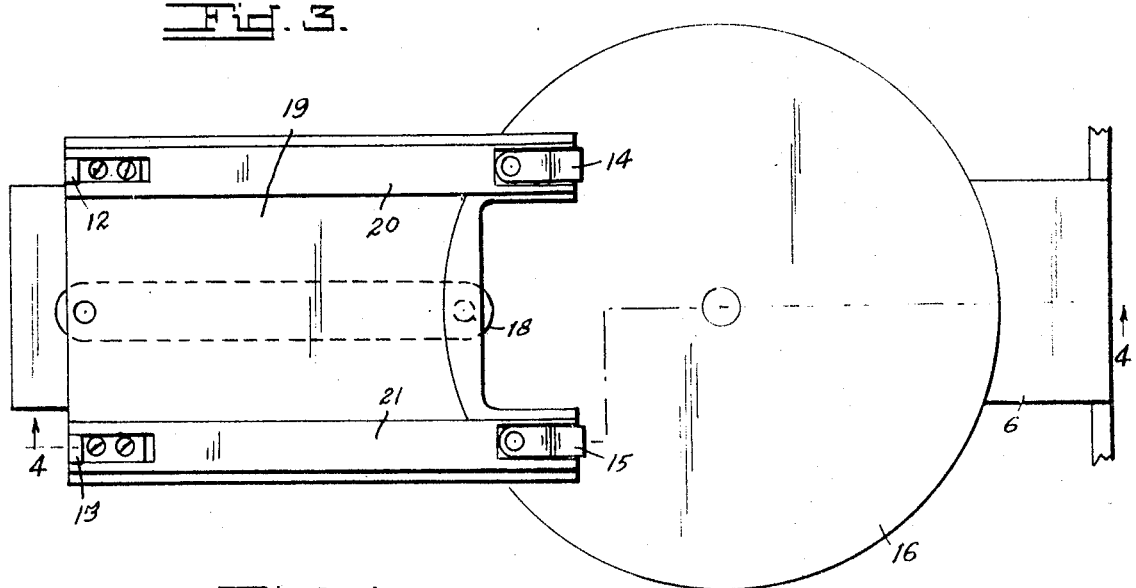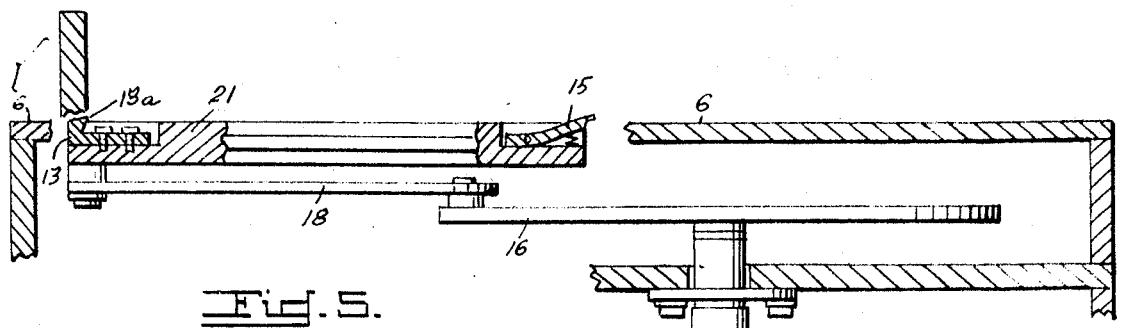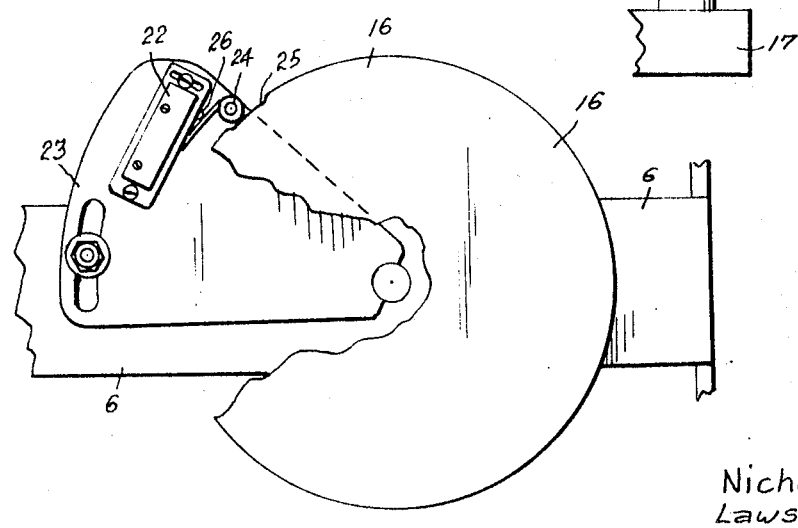

3,598,395

EDUCATIONAL TESTING APPARATUS

The invention described herein may be manufactured, used, and licensed by or for the Government for governmental purposes without the payment to us of any royalty thereon.

BRIEF SUMMARY

The invention may take the form of a punchcard holder to be placed on a desk. The holder has a tray for cards bearing questions, means to move the cards before the student one by one so that he can observe the questions and record his answers on the answer cards. The cards are then moved on to trays which receive the question cards and answer cards.

In the drawing:

FIGS. 1 and 2 are partial perspective views of the invention;

FIGS. 3 and 4 are views of apparatus used to reciprocate the card-advancing slides;

FIG. 5 is a view of apparatus used to stop the reciprocating apparatus periodically.

An example of the invention would be a desk-mounted unit say 26 inches wide, 10 inches deep, sloping downward from 5 inches at the rear to three-fourths of an inch at the front. There are three principal stations; feed hopper, station 1; presentation area, station 2; and stacking container, station 3.

The unit may have a front closure piece 4, a left-end closure piece 5, and right-end and back closure pieces, not shown. The base 6 for the working area slopes forward toward the user as illustrated. Feed hopper station 1 has areas 1a and 1b for two stacks of cards. Area 1a is substantially surrounded by upstanding walls 7, 8 and 9a to retain a stack of cards with questions or other stimulating material thereon. Upstanding wall 9a is a dividing wall between areas 1a and 1b and has a wall face 9b, which, together with walls 10 and 11, helps to retain a stack of cards in area 1b for the operator to record answers on.

Card transporter detents 12 and 13 are reciprocable from left to right and each projects above base surface 6 just far enough to engage the cards in the bottoms of areas 1a and 1b. As detents 12 and 13 are reciprocated toward the right they carry cards from areas 1a and 1b under walls 8 and 10 at slots 8a and 10a to areas 2a and 2b, respectively. At these areas the cards stop, the operator reads the question on the card at area 2a and records his answer on the card at area 2b. As the cards slide into area 2b they slide under cover 2c. The upper edge of cover 2c also serves as a guide to keep the cards in area 2a from sliding down the sloping face of base 6. After the answer is recorded detents 14 and 15 push the question and answer cards into catch trays 3a and 3b, respectively. Simultaneously detents 12 and 13 bring new question and answer cards from stations 1a, 1b to stations 2a, 2b. A cover 3c and dividing wall 3d may be provided at the catch tray or stacking container station 3.

In FIGS. 3 and 4 is shown the mechanism for reciprocating detents 12, 13, 14 and 15. FIG. 4 is taken along line 4—4 of FIG. 3 but omitting some structure in FIG. 3 for greater clarity. Turntable 16 is driven by motor 17. Linkage 18 is connected eccentrically to turntable 16 and to reciprocable carriage 19. Carriage 19 comprises slide member 20 carrying detents 12 and 14, and slide member 21 carrying detents 13 and 15. Slide members 20 and 21 have upper surfaces substantially flush with the upper surface of base 6. The upper surfaces of detents 12 and 13 slope upwardly to a point 12a or 13a slightly above the plane of base 6 and slides 20, 21. Therefore, the lowermost card in each stack is engaged and shoved to the right, from station 1 to station 2, each time the slides are reciprocated. As the slides are returned to the left, the surfaces, sloping downward from points 12a, 13a, slide beneath the cards without forcing them to the left.

Detents 14 and 15 act in a manner similar to detents 12 and 13. However, detents 14 and 15 are pivotally mounted and may be spring pressed upwardly. The leading edges engage cards at station 2 and shove them to station 3 upon movement to the right. Upon movement to the left, the springs allow the detents to be completely recessed below the surface of base 6 to avoid pushing the cards from station 2 back to station 1. The detents would act without springs if the left ends were made heavier than the right ends.

FIG. 5 illustrates simple apparatus for stopping turntable 16 after one revolution and one cycle of reciprocation of slide member 20 and 21. Switch 22 is adjustably mounted on plate 23 which is adjustably secured to a stationary member. The motor is energized and turntable 16 rotates one revolution for a cycle. Spring-pressed roller 24 then drops into recession 25 to release switch button 26 and stop the motor. AFter a time interval, after the operator has answered the question, the motor is again energized. This may be accomplished manually at the will of the operator, or automatically by a timing element, not shown.

If desired, a friction device may engage the turntable to assure a prompt stop after the motor is deenergized.

The device is particularly well suited to psychological experimentation because it permits experimenter control of stimulus and/or response durations and in addition facilitates the processing of the large amounts of sequential data derived in such experimental situations as decision making; attitude formation, probability learning, pattern detection, questionnaire, and survey research and in group-testing situations. This facilitation is achieved by the fact that the device permits the use of prepunched data processing cards as response cards. As a result, the cards can be prepunched with all relevant information and once the subject's response is keypunched, the response cards can be sent directly for computer processing without any further manual intervention. It is further apparent that a keypunch device could be used as an accessory for the device so that the subject himself could keypunch his answer directly into the card.

For example, by prepunching the response card with a subject identification number, an experiment identification number, a question identification number, and a question type identifier, an analysis can be made of responses in terms of subjects, questions, experiments, or question type by simply programming the computer for each of these analyses. As a consequence, such questions as the following are easily answered: (1) What is the probability that a subject will answer four consecutive questions "false"? (2) What percentage of subjects in experiment 1 answered question 02 false, and how does this compare with the subjects in experiment 04? (3) What type of false responses are associated with type A questions, and how does this compare with type B questions? (4) Is question 023 more likely to be answered correctly by high I.Q. subjects than by low I.Q. subjects, etc.?

We claim:

1. Educational testing apparatus comprising a frame having a base with an upper surface, hoppers for cards comprising a first station, a second station with a number of areas corresponding with the number of hoppers at the first station, a third station for receiving the cards, and transport means to move cards from said first station to said second station while simultaneously moving cards from said second station to said third station, and means to stop said transport means after a cycle during which a set of cards is moved from said second station to said third station and a set of cards is moved from said first station to said second station, said transport means comprising a slide member with a fixed detent to transport a card from each hopper to a corresponding second station area and a detent mounted on a pivot pin to transport a card from the second station to the third station, the pivoted detent automatically receding below the cards upon its return to avoid reverse transporting of the cards.

2. Apparatus as in claim 1 wherein said transport means further comprises a turntable with a link connected eccentrically thereto and to the slide member to reciprocate the slide member.

3. Apparatus as in claim 2 wherein said means to stop said transport means comprises a recess in the turntable to actuate a member, a switch, and means to activate said switch upon each revolution of said turntable in response to arrival of said recess at an area adjacent to said switch.